Jan. 5, 1932.                G. W. PENNEY                1,840,127
                    SEALING GLAND FOR ROTATABLE SHAFTS
                Filed March 27, 1928        3 Sheets-Sheet 1

INVENTOR
Gaylord W. Penney.
BY
[signature]
ATTORNEY

Jan. 5, 1932.  G. W. PENNEY  1,840,127
SEALING GLAND FOR ROTATABLE SHAFTS
Filed March 27, 1928  3 Sheets-Sheet 2

INVENTOR
Gaylord W. Penney.
BY
*Wesley G. Carr*
ATTORNEY

Jan. 5, 1932.         G. W. PENNEY         1,840,127
SEALING GLAND FOR ROTATABLE SHAFTS
Filed March 27, 1928    3 Sheets-Sheet 3

INVENTOR
Gaylord W. Penney.
BY
ATTORNEY

Patented Jan. 5, 1932

1,840,127

UNITED STATES PATENT OFFICE

GAYLORD W. PENNEY, OF WILKINSBURG, PENNSYLVANIA, ASSIGNOR TO WESTINGHOUSE ELECTRIC & MANUFACTURING COMPANY, A CORPORATION OF PENNSYLVANIA

SEALING GLAND FOR ROTATABLE SHAFTS

Application filed March 27, 1928. Serial No. 265,205.

My invention relates to gas-ventilated dynamo-electric machines and more particularly to sealing glands for preventing leakage of gas along the rotatable shaft.

In apparatus where the shaft passes through a casing, great difficulty has been encountered in providing a gas-tight seal, particularly when the gas, or one of the gases which are present, forms an explosive mixture when in contact with air or oxygen. An example of such applications is found in hydrogen-cooled electric machines, where the hydrogen is circulated and recirculated within the machine casing.

Liquid seals, wherein a flow of liquid over the shaft opposes the flow of the gas have been employed heretofore, but have been found to have several disadvantages. Firstly, the liquid, which is usually oil, carries small quantities of air. If large quantities of oil are circulated through a seal, the possibility of hazards due to greater quantities of air in contact with the hydrogen, will be obviously increased. Secondly, the hydrogen is absorbed by the liquid, and is thereby provided with a path of escape.

It is one object of my invention to restrict the flow of oil to a minimum and thereby to keep out large quantities of air, as well as to reduce the amount of oil with which the hydrogen will have to make contact. With only a small quantity of hydrogen absorbed or taken off by the oil, the need for an elaborate device for extracting the gas from the liquid is consequently eliminated.

A further object of my invention is to provide a liquid sealing gland wherein only a small quantity of liquid is necessary for opposing the escape of gas along the shaft.

With the foregoing and other objects in view, my invention consists in the methods and combinations hereinafter described and claimed.

Figure 1:
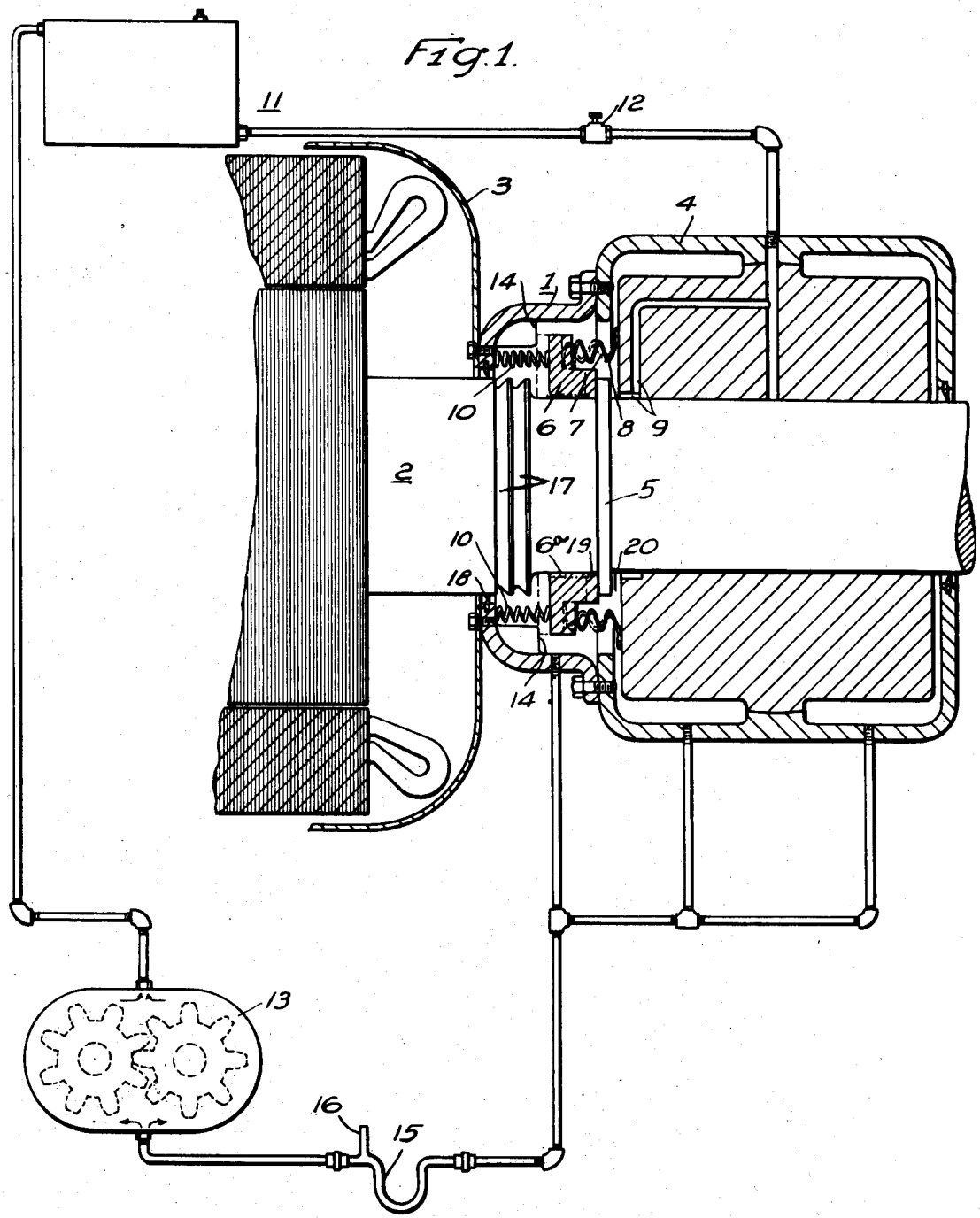
Figure 2:
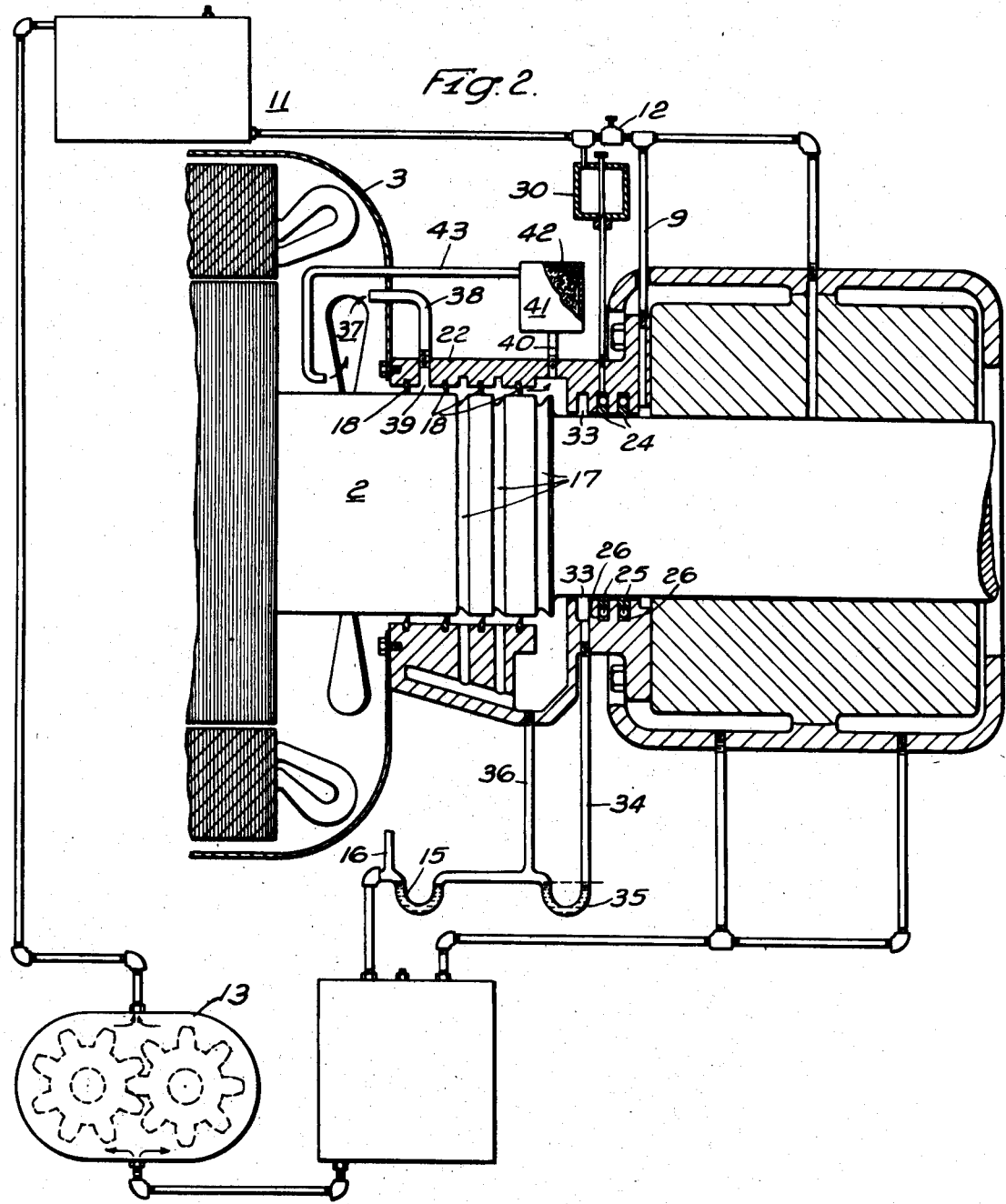

For an understanding of the forms which my invention may take, reference may be had to the accompanying drawings, wherein Fig. 1 is a sectional view of an embodiment of my invention in connection with a shaft and a bearing of a dynamo-electric machine, Fig. 2 is a sectional view of apparatus embodying my invention in the form now preferred by me, Fig. 3 is a sectional view of an end frame member associated with a shaft and embodying my invention in a still other form, having certain special advantages, and Figs. 4 and 5 are detail views of the means utilized in the structures shown in Figs. 2 and 3 for restricting the flow of liquid along the shaft.

In the apparatus shown in Fig. 1, my sealing gland is embodied in a casing, designated in its entirety by the numeral 1, surrounding the rotatable member or shaft 2 of a hydrogen-cooled dynamo-electric machine. The sealing gland 1 is disposed immediately outside of the machine casing 3, and between the latter and the shaft-bearing 4. In fact, the casing of the machine and the casing of my sealing gland and parts hermetically joined thereto, may be regarded as comprising, in effect, a single over-all casing enclosing the whole. Integral with the shaft, or fixed thereto, is a collar 5 which constitutes a part of my sealing gland, as will presently be described.

My sealing gland, as shown in Fig. 1, also comprises a ring member 6 which is slidably mounted on the shaft 2, but is restrained from rotating therewith, being connected to the bearing housing 4 by means of a bellows 7, thus providing a chamber 8 to which oil may be supplied through a passageway 9 in the bearing 4. The sliding ring 6 is so disposed that the collar 5 on the shaft is between it and the bearing, and it is normally pressed against the collar by spring members 10.

When the shaft is stationary, the contact between the oiled surfaces of the sliding ring member 6 and the collar 5, which may be ground like a valve-seat, if necessary, provides a seal for preventing the leakage of gas from the hermetically sealed machine and gland casings 3 and 1 to the bearing 4, whence it would easily escape to the atmosphere.

Before starting the machine, oil is always supplied to the bearing under pressure, and the same oil pressure system may be connected to the gland. The oiling system 11 is put into operation by opening a valve 12 which admits oil to both the bearing and the gland. An oil pump 13, which constitutes a part of the pumping system, may be either separately driven or driven from the machine shaft 2.

When the oil, which is under a pressure of some five inches of water, is thus admitted to the sealing chamber 8, the sliding ring 6 is forced out of contact with the collar 5 of the shaft, as indicated in dotted lines, thereby avoiding the excessive friction which would otherwise exist at this point, the movement of the sliding ring 6 being limited by suitable stops 14.

The clearance between the ring 6 and the shaft 2 is as small as possible so that the maximum possible flow of oil is allowed to pass between the ring member and the shaft, the oil flow in the seal being restricted in order to limit the quantity of oil which comes in contact with the hydrogen, thus limiting the amount of hydrogen that is absorbed by the oil utilized for sealing. It will be noted that the oil flow between the ring 6 and the shaft 2 is opposite to the direction in which the hydrogen would have to flow in order to escape, thus providing a very effective seal. The bore of the sliding ring may be provided with annular grooves 6a, or with the expansible metal rings hereinafter described, to reduce the amount of oil flowing out of the bellows chamber 8.

The sealing oil that slowly escapes from under the ring 6 is immediately collected in the bottom of the casing 1 and drained therefrom through a trap member 15, which serves to prevent any hydrogen from escaping with the oil. The trap or goose-neck 15 is provided with a vent pipe 16 for preventing all of the oil from being sucked out of the trap, the vent pipe standing up high enough to prevent the escape of oil therethrough.

Any oil which tends to creep along the shaft toward the machine is thrown off by centrifugal force upon reaching the usual oil-throwing grooves 17 provided in the shaft, and any oil vapors that pass the oil-throwing grooves are arrested or retarded by one or more labyrinth rings 18 of usual construction.

When the machine is rotating there is a space 19 between the collar 5 and the sealing ring 6, and the oil therein will be caused to rotate by reason of the rotation of the shaft. The rotation of the oil will produce a centrifugal force tending to throw the oil out of this space, away from the sealing ring, which would break the seal between the shaft and the ring. To overcome this action a similar space 20 is provided between the bearing and the collar 5 and the oil-supply pipe 9 opens into this chamber at a point near the shaft. Then a centrifugal action is developed in this second chamber 20, which balances the pressure developed in the first chamber 19, producing a pressure at the clearance between the shaft and the sealing ring equal to the pressure supplied by the oil-supply pipe 9, thus insuring a pressure at the seal in spite of the centrifugal action.

The important features of my invention, as shown in Fig. 1, as well as in all other forms of my invention, are the provision of a movable part which constitutes, in effect, a valve seat, preventing the escape of gas by means of a stationary film of oil on the valve seat, when the shaft is stationary, the valve seat opening, when the shaft revolves, to permit an oil-flow which prevents the escape of the gas, the oil-flow being limited, however, to the smallest amount possible, which is a very important means for preventing both the escape of the gas and the contamination of the gas by air already entrapped in the oil and given off in the gland.

In the preferred form of embodiment of my invention, which is shown in Fig. 2, the flow of the oil within the gland 22 is restricted by means of one or more expansible rings 24, which are yieldably constricted around the shaft by garter springs 25, and which fit, with extremely small clearance, in grooves 26 which are provided within the housing of the gland. The expansible rings preferably take the form shown in Figs. 4 and 5, where a ring is shown to be made up of interlocking segments 27 having closely fitting rabbeted ends, as shown in Fig. 5, the periphery being provided with a groove 28 for receiving the garter spring member 25. The bore of the ring is preferably serrated, as indicated at 29, in order to reduce the frictional area with the shaft.

The collapsible metallic sealing rings 24 of Figs. 2 to 5 are particularly effective because they can be made with a much smaller clearance between the rings and the side walls of the grooves 26 than is possible between the bore of a solid ring, as the sliding ring 6 of Fig. 1, and the shaft. The reason for this is that the metal parts expand and contract a certain proportion of this length, as a result of heating and cooling, and some parts may become hotter than others. The expansion and contraction of the solid ring 6 of Fig. 1 results in a change of diameter of the bore of the order of a hundredth of an inch, in a ring having an eight-inch bore. An equal temperature-change in the collapsible ring 24 of Fig. 2 would result in a change of width of only one-sixteenth as much, in a ring one-half inch wide. Furthermore, the narrow, collapsible ring 24, being in much more intimate relation to the grooved casing 22 than the sliding ring 6 and the shaft, will not be subject to as great temperature difference between it and the adjacent, closely fitting part, so that average clearances of less than 1½ mils on each side of the collapsible rings 24 may easily be maintained. The oil will fill these clearances by capillary action, but will not flow appreciably therethrough.

When the shaft is stationary, the garter springs 25 hold the collapsible rings 24 down against the shaft, with only a thin oil film therebetween, so that both oil-flow and gas-leakage are effectively prevented. The presence of an oil film at all times may be assured by means of a drip cup 30, as shown in Fig. 2.

When the shaft is rotating, the collapsible rings 24, being restrained from rotation by any suitable means, such as the pin 31 shown in Figs. 4 and 5, is lifted slightly off the shaft by the familiar wedging action of the oil, which may be facilitated by providing wedge-shaped cut-away portions 32 in the bore of the rings 24, as at the ends of the constituent segments 27 of the rings, as shown in Fig. 4. Consequently a small amount of oil is allowed to flow underneath the collapsible sealing rings 24, and again this amount is restricted to the minimum possible amount in order to limit the quantity of oil exposed to the hydrogen in the machine casing 3.

To still further reduce the amount of sealing oil which is exposed to the hydrogen, in the hydrogen, in the device shown in Fig. 2 a groove or trap 33 may be provided within the bore of the gland casing 22, from which almost all of the oil is drained through a drain-pipe 34 and a goose-neck 35. In this way, only the small quantity of oil that adheres to the shaft as a tenacious film creeps along the shaft towards the hydrogen-cooled machine, until it is thrown off by the oil throwers 17 and collected in the bottom of the gland casing, whence it is withdrawn through a drainage pipe 36 and the goose-neck 15 previously described.

The purpose of the first drain 34 is to remove as much of the oil as possible from the gland, so that there will be a minimum contact between the oil and the hydrogen. If this oil were allowed to flow over extended surfaces in contact with hydrogen, much more air would be given off from the oil and more hydrogen would be absorbed by the oil.

The purpose of the goose-necks 35 and 15 (best shown in Fig. 2) is to prevent the escape of the hydrogen, which is at a pressure of about ½ inch of water above atmospheric pressure, at the minimum-pressure point within the machine, which is substantially the pressure at the gland. The goose-necks are made deep enough to withstand the maximum gas pressure that is, or may be, generated in the machine.

In order to prevent any trouble which may be caused by frothing of the oil, or other sealing liquid, I provide means whereby gases from the machine may be circulated over a portion of the shaft where the liquid vapors are thrown off by the oil-throwing grooves 17, and the mixture is passed to a separator of any type where the vapors are absorbed or extracted, after which the gas again passes into the machine for re-circulation. This device comprises a fan 37 within the machine, near the gland 22 taking gas from within the machine and delivering it, through a pipe 38, to the gland casing at an intermediate point 39 between the labyrinth rings 18. The portion of the gas which flows from the point 39 toward the interior of the gland chamber 22 absorbs liquid vapors as it passes along the shaft, and finally escapes through a pipe 40, to a separating device 41, which may contain absorbent material 42 for absorbing the vapors. The dry gas passes off through a pipe 43 to the suction side of the fan 37.

In the modification shown in Fig. 3, my gland casing is an integral portion of the end frame 44 of the hydrogen-cooled dynamo-electric machine.

An important feature of the sealing gland shown in Fig. 3 is the method of cooling it. The ordinary practice, in bearing design, is to cool the bearing by passing a large volume of oil through it, past the bearing surfaces, thus preventing excessive heating of the oil film. In my present gland, this practice is departed from, and only the smallest possible flow, or longitudinal displacement, of the oil film is permitted.

In order to provide for the usual circulation of a large quantity of oil, thereby preventing local heating, while limiting the quantity of oil which comes into contact with the hydrogen, my invention comprises, as an important feature, means for dividing the oil stream, most of which is passed through an annular cooling chamber 46 in the casing of the gland, entering the top of the cooling chamber, through an intake pipe 47, and leaving it through an outlet pipe 49 at the bottom, which may be provided with a valve 50 by means of which the flow may be controlled.

The annular cooling chamber is separated, by only thin metal walls, from two grooves 51 and 52 in the bore of the gland-casing, which receive two collapsible ring seals 24 such as have been previously described. A very small quantity of oil is diverted from the top of the cooling chamber, by means of a small hole 53, and is supplied to the shaft at a point between the two sealing rings 24. At the oil-supply point 53, the oil flow again divides, only a part of it flowing toward the machine under the collapsible sealing ring in the groove 52, the other part toward the bearing 55, which in this case is a separate structure, passing under the collapsible sealing ring in the other groove 51.

The oil which contacts with the hydrogen gas in the machine is collected in a chamber 57 which drains into a second chamber 58 through a communicating passage 59 at the bottom of the two chambers. An oil-diverting groove 60, in the bore of the gland, which serves the same purpose as the groove 33 in Fig. 2, is also connected to the bottom of second chamber 58, by means of a hole 61. A drainage pipe 63 extends upwardly into the second chamber 58 to an oil level 64 that is purposely maintained to act as a trap to prevent the escape of the hydrogen which is in the top of the first chamber 57. It will be noted that the oil which is exposed to the hydrogen in the first chamber is practically dead or trapped, because no oil enters the chamber except such small quantities as are caught by the oil throwers 17, and hence no harm is caused by the exposure.

The oil which flows toward the bearing 55 is collected in a pocket 66 in the bottom of the casing and discharged through an outlet pipe 67.

While I have described the sealing liquid as oil, and as being associated with the oil-supply system of the bearing, it is obvious that the sealing liquid may be independent of the bearing and may be any liquid having lubricating qualities, that is, having viscosity and the property of adhering to the lubricated surface, and I wish the term "oil" to be so understood.

Also while I have described the gland or seal as preventing the passage or escape of hydrogen gas, it is obvious that my invention is equally effective in preventing the escape of other gases.

In general, while I have described three specific embodiments of my invention, and explained or illustrated the principles of design and operation in each case, I desire it to be distinctly understood that such explanations and descriptions are illustrative only, and are not to be read specifically into the appended claims except where required by the language of the claims when considered in the light of the prior art.

I claim as my invention:

1. The combination with the shaft and end frame of a gas-filled machine, of a casing surrounding the shaft, a plurality of labyrinth rings surrounding the shaft, a liquid entering the casing and opposing the flow of gas out of the machine, means for minimizing the flow of liquid about the shaft, trap means for draining liquid from the casing, and means whereby a small amount of the gas within the machine is circulated through a region along the shaft and having means associated therewith for separating gas and liquid vapors, drains disposed between pairs of labyrinth rings for taking leakage liquid from the surface of the shaft, means for providing a chamber in the base of the casing for collecting the liquid, and a trap means for withdrawing the liquid from the chamber.

2. In combination, a rotatable member, a casing surrounding said member, a plurality of grooves in said casing, a liquid entering the casing, expansible means within said grooves and surrounding said rotatable member for restricting the flow of liquid along said member when rotating, and means for conducting liquid to one of said grooves back of the expansible means to insure the presence of a liquid film when the said rotatable member is stationary.

3. In a machine having a gas-tight casing and a rotatable shaft extending through said casing, a gland for making a gas-tight joint between said shaft and said casing, comprising a gland casing having a bore surrounding the shaft, an annular groove in said bore, an expansible ring disposed in said groove with a substantially oil-tight clearance with the side walls of the grooves, means for causing said expansible ring to tend to grip said shaft, means for supplying oil under a slight pressure to the gland casing at a point on the shaft outside of said expansible ring, the wedging action of the oil-film under said ring during the rotation of the shaft lifting the ring from the shaft sufficiently to permit a slow flow of oil along the shaft toward the machine, and means for supplying an occasional drop of oil to said expansible ring to insure the presence of an oil film at all times when the shaft is stationary, thereby maintaining a gas-tight seal.

4. In combination, a machine containing a gas lighter than air, a rotatable shaft extending from said machine, an oil bearing for said shaft and an oil-sealing gland, for preventing the escape of gas from said machine, disposed between said machine and said bearing and rigidly carried by said bearing, said oil-sealing gland being provided with a valve resiliently engaging said shaft, means for providing a stationary film of oil on said valve when the shaft is stationary, an oil-pressure system for supplying oil to said bearing so arranged that oil may be supplied to said bearing prior to the starting of the machine, means for automatically supplying oil to said gland from the same oil-supply system when oil is supplied to said bearing prior to the starting of the machine, whereby said valve is opened to provide restricted oil flow to oppose the flow of leakage gas from said machine during its running period.

5. In combination, a machine containing a gas lighter than air, a rotatable shaft extending from said machine, an oil bearing for said shaft and an oil-sealing gland, for preventing the escape of gas from said machine, disposed between said machine and said bearing and rigidly carried by said bearing, said oil-sealing gland being provided with a valve resiliently engaging said shaft, means for providing a stationary film of oil on said valve when the shaft is stationary, an oil-pressure system for supplying oil to said bearing so arranged that oil may be supplied to said bearing prior to the starting of the machine, means for automatically supplying oil to said gland from the same oil-supply system when oil is supplied to said bearing prior to the starting of the machine, whereby said valve is opened to provide restricted oil flow to oppose the flow of leakage gas from said machine during its running period, means for collecting the sealing oil that slowly escapes through said valve, a trap member in said collecting means serving to substantially prevent any cooling gas from escaping with the oil, means for preventing all of the oil from being sucked out of said trap, and means associated with said shaft and with said gland for substantially preventing creepage of oil along the shaft toward said machine.

6. In combination, a machine containing a gas lighter than air, a rotatable shaft extending from said machine, a liquid-sealing means for preventing the escape of gas, from said machine comprising a fluid-tight casing, means for supplying sealing liquid to said casing, means for causing a longitudinal flow of liquid along a portion of the shaft, opposing the flow of leakage gas, chamber means for collecting the leakage gas in which there may be found destructive liquid vapors if allowed to pass into said machine, and means for causing a flow of scavenging gas through said gas-collecting chamber for the elimination of liquid vapors therein.

7. In combination, a machine containing a gas lighter than air, a rotatable shaft extending from said machine, a liquid-sealing means for preventing the escape of gas from said machine comprising a fluid-tight casing, means for supplying sealing liquid to said casing, means for causing a longitudinal flow of liquid along a portion of the shaft, opposing the flow of leakage gas, chamber means for collecting the leakage gas in which there may be found destructive liquid vapors if allowed to pass into said machine, and means for circulating a portion of the gas within said machine through said chamber to absorb the liquid vapors and including means for separating the liquid vapors from the gas before allowing the gas to return to the machine.

8. In combination, a machine containing a gas lighter than air, a rotatable shaft extending from said machine, a liquid-sealing means for preventing the escape of gas from said machine comprising a fluid-tight casing, means for supplying sealing liquid to said casing, means for causing a longitudinal flow of liquid along a portion of the shaft, opposing the flow of leakage gas, chamber means for collecting the leakage gas in which there may be found destructive liquid vapors if allowed to pass into said machine, and means for circulating a portion of the gas within said machine through said chamber to absorb the liquid vapors which, in turn, comprises a fan means carried by said rotatable shaft having a pressure side and a suction side, means for taking gas from the pressure side of said fan and directing it to one end of the chamber, means for taking a mixture of liquid vapors and gas from the other end of said chamber, a separator means for extracting the liquid vapors from the mixture and means for directing the cleaned gas to the suction side of said fan for recirculation.

9. In combination, a machine containing a gas lighter than air, a rotatable shaft extending from said machine, a liquid-sealing means for preventing the escape of gas from said machine comprising a fluid-tight casing, means for supplying sealing liquid to said casing, means for causing a longitudinal flow of liquid along a portion of the shaft, opposing the flow of leakage gas, chamber means for collecting the leakage gas in which there may be found destructive liquid vapors if allowed to pass into said machine, labyrinth rings surrounding the shaft to prevent, so far as possible, the flow of liquid and liquid vapors tending to pass into said machine, liquid throwers on said shaft for preventing the creepage of liquid along the surface of the shaft, means for eliminating the liquid vapors from said chamber comprising a fan means carried by said rotatable shaft having a pressure side and a suction side, means for taking gas from the pressure side of said fan and directing it to one end of the chamber, means for taking a mixture of liquid vapors and gas from the other end of said chamber, a separator means for extracting the liquid vapors from the mixture and means for directing the cleaned gas to the suction side of said fan for recirculation.

10. In a gas-filled rotating-shaft machine having gas at a pressure slightly in excess of atmospheric pressure, a rotatable shaft, bearings therefor, the bearing housing and machine housing being hermetically joined, means for supplying lubricating oil to said bearings when said shaft is in motion, and means for restricting the contact of escaping gas with the bearing-oil when the shaft is in motion, and for effectively sealing said shaft when it is at rest, comprising an expansible device yieldably surrounding the shaft on the machine side of the bearing oiling means.

11. The invention as specified in claim 10, characterized by trap means for prohibiting the escape of gas upon extraction of the liquid from the casing.

12. The invention as specified in claim 10, characterized by a labyrinth surrounding the shaft on the machine side of said expansible device.

13. The invention as specified in claim 10, characterized by means for withdrawing as much excess oil as possible from the machine side of said expansible device.

14. The invention as specified in claim 10, characterized by means surrounding the shaft on the machine side of said expansible device for withdrawing oil-vapor-laden gas from the shaft, filtering out the oil-vapor, and returning the gas to the machine.

15. The invention as specified in claim 10, characterized by a gland casing having a bore surrounding the shaft, an annular groove in said bore, an expansible ring disposed in said groove with a substantially oil-tight clearance with the side walls of the grooves, means for causing said expansible ring to tend to grip said shaft, means for supplying oil under a slight pressure to the gland casing at a point outside of said expansible ring, the wedging action of the oil-film under said ring during the rotation of the shaft lifting the ring from the shaft sufficiently to permit a slow flow of oil along the shaft toward the machine, and a drain close to said expansible ring on the machine side thereof for carrying off excess oil.

In testimony whereof, I have hereunto subscribed my name this 22nd day of March, 1928.

GAYLORD W. PENNEY.